(12) United States Patent  (10) Patent No.: US 6,529,288 B1
Miyazaki  (45) Date of Patent: Mar. 4, 2003

(54) DIGITAL PRINTING SYSTEM

(75) Inventor: Takao Miyazaki, Saitama (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/487,238

(22) Filed: Jan. 20, 2000

(30) Foreign Application Priority Data

Jan. 22, 1999 (JP) .......................................... 11-014783

(51) Int. Cl.[7] .............................................. G06K 15/00
(52) U.S. Cl. ...................................... 358/1.16; 358/1.1
(58) Field of Search .......................... 358/1.1, 1.4, 1.6, 358/1.12, 1.13, 1.15, 1.16, 1.18, 540, 539, 472; 707/501.1, 509, 510, 513, 515, 516, 500, 512, 522

(56) References Cited

U.S. PATENT DOCUMENTS 6,356,923 B1 * 3/2002 Yano et al. ................. 707/500

* cited by examiner

Primary Examiner—Arthur G. Evans
(74) Attorney, Agent, or Firm—Sughrue Mion, PLLC

(57) ABSTRACT

When printing an image frame on the basis of digital image data, a printer produces a bar code representative of a memory location storing the image data, and prints it on one side of the image frame. To reprint the image frame, the printer reads out the bar code from the initial print, to retrieve the image data from the memory location determined by the bar code. Thus, the same image frame is reprinted on the basis of the same image data.

17 Claims, 5 Drawing Sheets

DIGITAL PRINTING SYSTEM

BACKGROUND OF THE INVENTION

1. Field of the Invention

The present invention relates to a digital printing system, including a digital printing method, a digital printer and prints made according to that printing method.

2. Background Arts

Recently, high-performance digital image forming devices, such as digital cameras, digital printers and personal computers, are provided at lower prices than conventional, so they are rapidly spreading in the world. As a result, many people want to enjoy printing more easily on the basis of digital image data that may be picked up through the digital camera or an image scanner, or processed in the personal computer.

To reprint an image frame on the basis of digital image data initially used for printing the image frame, it is necessary to retrieve the image data. So far as a memory card or another memory medium that stores the image data is loaded in the printer or the personal computer or the like, the image data of the image frame to reprint is relatively easy to find. However, it has been necessary for the operator to check if the retrieved image data really represents the image frame to reprint by observing a simulation image displayed on a screen based on the retrieved image data, and comparing it with the initial hard copy. Moreover, once the memory card is unloaded from the printer or the like, and is unused for a certain time, the memory card itself can be difficult to identify, so it can take a certain time to find the original image data. Since the conventional printer cannot designate many and unspecific memory locations, e.g. those of external image data resources on the Net, the range of image data available for reprinting is limited.

SUMMARY OF THE INVENTION

In view of the foregoing, an object of the present invention is to provide a digital printing system that makes it easy to reprint an image based on image data used for printing that image initially wherever the image data is stored.

To achieve the above and other objects, a printer of the present invention is provided with a data entering device for entering data of a memory location; a data taking device for taking image data from the memory location in accordance with the memory location data; and a printing device for printing an image frame on the basis of the image data.

Because the data taking device automatically take the image data from the memory location designated by the memory location data entered through the data entering device, the image data is easy to retrieve.

According to a preferred embodiment, the printer is further provided with a second printing device for printing the memory location data, e.g. in the form of a bar code, along with the image frame, and the data entering device comprises a device for reading the printed memory location data.

Thereby, the memory location is determined by the memory location data printed on one side of the image frame, so the same image data as used initially for printing an image frame is automatically retrieved from the memory location designated by the memory location data.

It is preferable to provide the printer with a data communication device for taking the image data from an external image data resource. In that case, it is desirable to design the data taking device to take the image data from the external image data resource when a correct password or correct ID data is entered.

According to a printing method, data of a memory location storing digital image data of an image frame is printed along with the image frame. The printed memory location data is read out from the initial print when to reprint the image frame. In accordance with the memory location data, the image data is retrieved from the memory location, and the image frame is reprinted on the basis of the retrieved image data.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limiting the present invention, wherein like reference numerals designate like or corresponding parts throughout the several views, and wherein.

DETAILED DESCRIPTION OF THE PREFERRED EMBODIMENT

Figure 1:
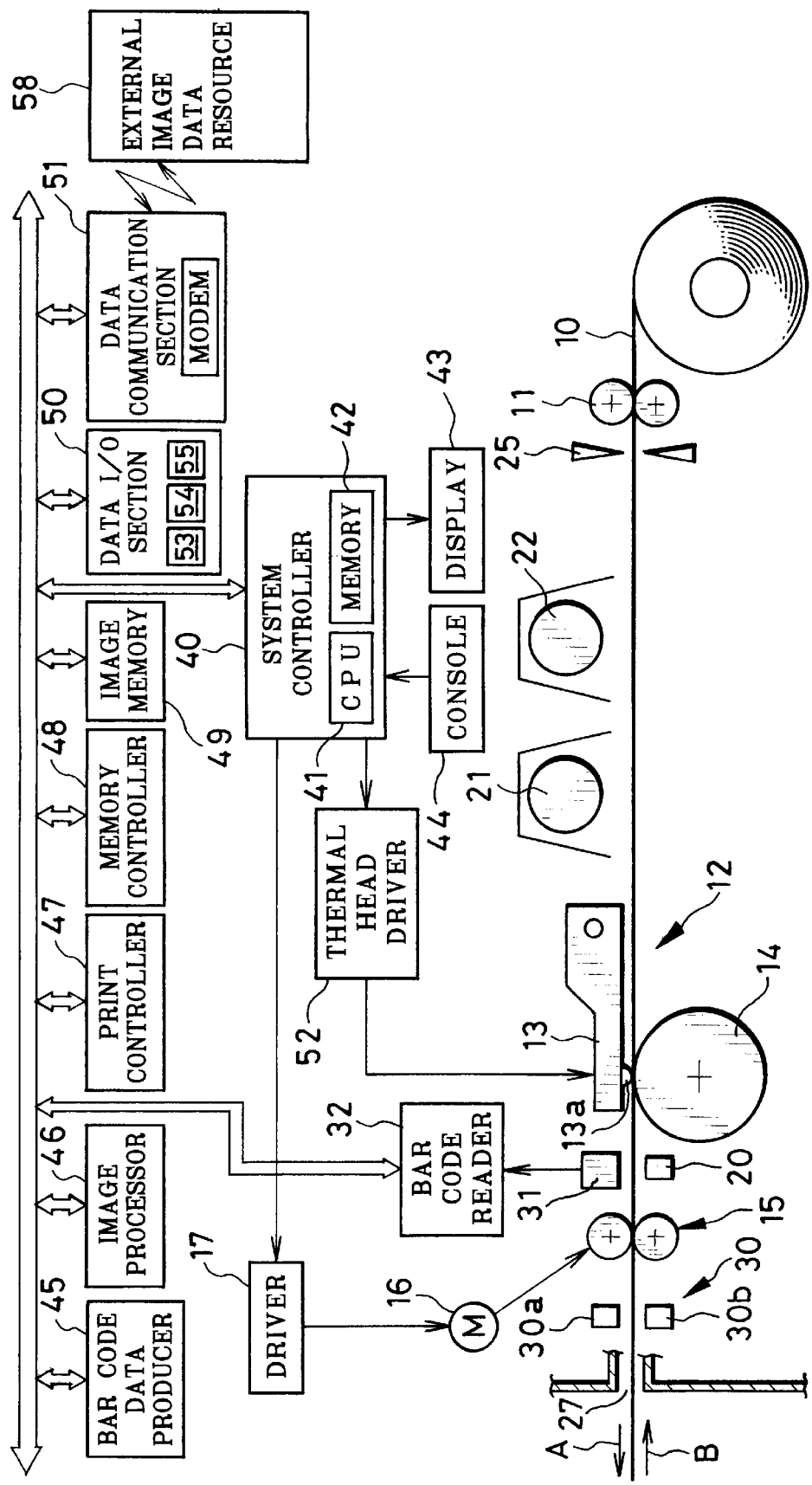
FIG. 1 is a block diagram of a thermosensitive color printer according to an embodiment of the present invention.

In a thermosensitive color printer shown in FIG. 1, a roll of thermosensitive color recording paper 10 is fed out through a pair of supply rollers 11 to a printing stage 12 consisting of a thermal head 13 and a platen roller 14, and a pair of feed rollers 15. The thermosensitive color recording paper 10 consists of yellow, magenta and cyan thermosensitive coloring layers formed on a support in this order from an obverse thereof. The feed rollers 15 are turned by a motor 16 in opposite directions to move the recording paper 10 in a printing direction shown by an arrow A in FIG. 1, and in a reverse direction B. The motor 16 is controlled by a system controller 40 through a motor driver 17. The thermal head 13 heats the recording paper 10 through its heating elements 13a to record a full-color image on a recording area of the recording paper 10 in a three color frame sequential fashion while the recording paper 10 moves in the printing direction A.

To discriminate the individual recording areas, not-shown positioning marks are provided between the individual recording areas on a back of the recording paper 10. A mark sensor 20 is disposed between the feed roller pair 15 and the platen roller 14, for detecting the positioning marks. According to a mark detection signal from the mark sensor 20, a print start position of each recording area is determined at the start of recording each of the three color frames.

Optical fixing devices 21 and 22 are disposed between the thermal head 13 and the supply roller pair 11. While the recording paper 10 is moved in the reverse direction B after the yellow frame is recorded on the yellow coloring layer, the optical fixing device 21 projects near ultraviolet rays of around 420 nm onto the recording paper 10 to fix the yellow coloring layer optically. The optical fixing device 22 projects ultraviolet rays of around 365 nm onto the recording paper 10 to fix the magenta coloring layer optically after the magenta frame is recorded on the magenta coloring layer while the recording paper 10 is moved in the reverse direction B. The magenta fixing device 22 projects the ultraviolet rays onto the recording paper 10 also while the recording paper 10 is moved in the reverse direction B after the cyan frame recording, to bleach blank areas of the recording paper 10 that get an yellowish hue because of heat.

A cutter 25 is disposed near the supply roller pair 11 on the side of the magenta fixing device 22. The cutter 25 cuts the recording area having the three color frames recorded thereon off the recording paper 10, to provide a sheet of print 29 (see FIG. 2). The print sheet 29 is conveyed by the feed roller pair 15 in the printing direction A and is ejected through a paper I/O port 27. While the recording paper 10 is moved in the reverse direction B, as well as while the cut print sheet 29 is ejected, the heating elements 13a of the thermal head 13 are removed from the platen roller 14.

Figure 2:
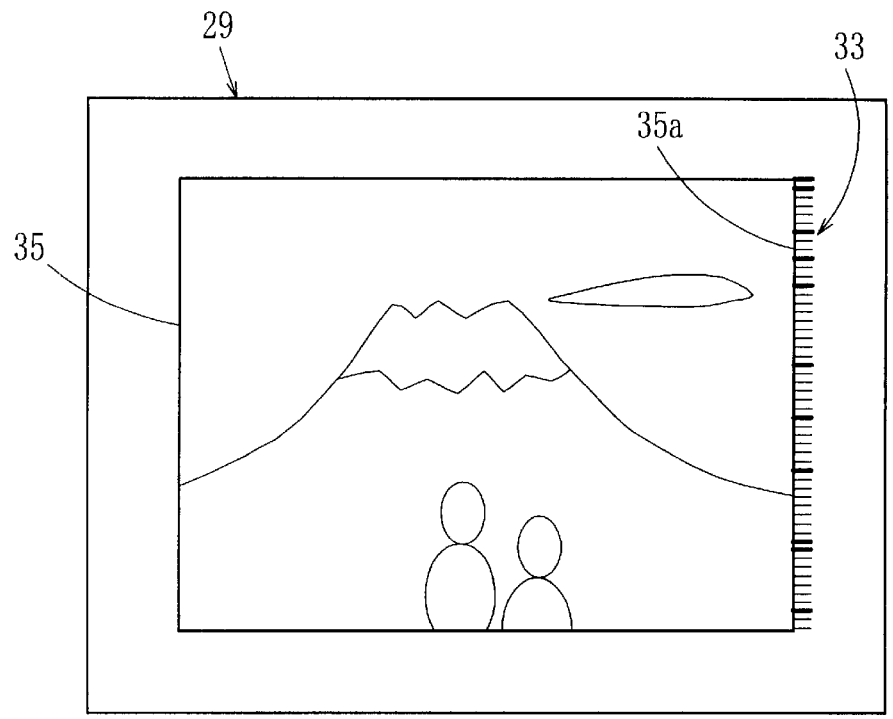
FIG. 2 is a schematic diagram illustrating an example of print sheet made by the thermosensitive color printer, wherein an image frame is printed with a bar code addressing a memory location of image data of that image frame.

In addition to the above elements necessary for ordinary printing, the thermosensitive color printer of the present invention has a function to record a bar code 33 along a margin 35a of an image frame 35, as shown for example in FIG. 2. The bar code 33 represents a memory location of image data of the image frame 35. As the memory location, a directory name and a file name are usually used. If the image data is downloaded from the Net, the URL (uniform resource locators) name of the image data resource is added to the directory and file names. If the thermosensitive color printer is connected to an image server of an external computer or the like, an identification name of that external device is added in the memory location.

The thermosensitive color printer also has a function to read the bar code 33 from the print sheet 29. To read the bar code 33, a bar code sensor 31 is disposed between the thermal head and the feed roller pair 15 on the obverse side of the recording paper 10. The bar code sensor 31 is connected to a bar code reader 32, and the bar code reader 32 is connected to the system controller 40. The bar code sensor 31 and the bar code reader 32 read and decode the bar code 33 when the printed sheet 29 is inserted into the paper I/O port 27. When the bar code reader 32 reads the bar code 33, the image data of the image frame 35 is read out from the memory location designated by the bar code 33, to print the same image as the image frame 35. To detect that the print sheet 29 is inserted into the paper I/O port 27, a photo-interrupter type paper sensor 30 consisting of a light projector 30a and a light receptor 30b is disposed behind the paper I/O port 27.

The system controller 40 is provided with a CPU 41, a memory 42, a display 43, and a console 44. The system controller 40 is connected to a bar code data producer 45, an image processor 46, a printer controller 47, a memory controller 48, an image memory 49, a data I/O section, and a data communication section 51.

The bar code data producer 45 produces bar code data from data items indicating the memory location of image data. The image processor 46 carries out various kinds of conventional image processing, such as color correction and edge enhancement, and also synthesizes the bar code data with the image data in order to print the bar code 33 along the margin 35a of the image frame 35. The bar code 33 may be printed in any appropriate color, but it is preferable to print the bar code 33 in a single primary color, i.e. yellow, magenta or cyan. Thereby, the bar code 33 will not get any color failure. Printing the bar code 33 in yellow is the most preferable because the color of yellow is the least conspicuous, and it is desirable to make the bar code 33 inconspicuous.

The print controller 47 reads out image data processed in the image processor 46, line by line, and sends it to a thermal head driver 52 through the system controller 40. The memory controller 48 controls reading and writing of the image memory 49. Image data read out from the image memory 49 is sent to the image processor 46 or a thermal head driver 52 through the system controller 40. The image memory 49 is a large capacity memory device such as a hard disc.

The data I/O section 50 is provided with an FD (floppy disc) driver 53, a CD-ROM device 54, and a memory card reader/writer 55. It is possible to make the data I/O section 50 adjustable to PD, DVD and other memory media.

The data communication section 51 is constituted of a conventional modem 56, telephone lines 57 and other data communication means, through which image data is downloaded from an external image data resource 58, such as an image server on the Net or a personal computer. It is possible to use a router, TA (a terminal adapter), DSU (a digital service unit) or the like in place of the modem 56.

Figure 3:
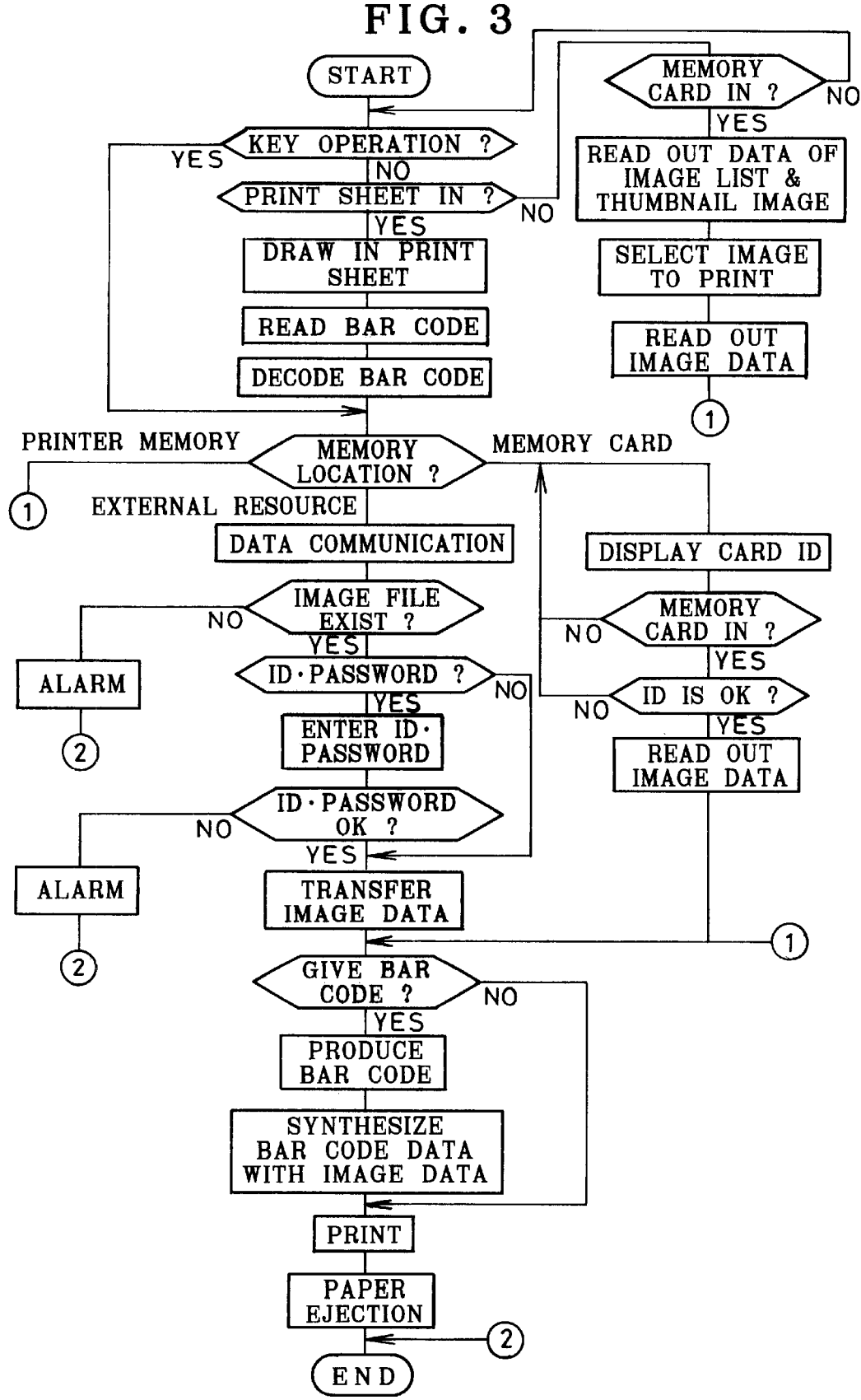
FIG. 3 is a flow chart illustrating an operation sequence of the thermosensitive color printer.

The system controller 40 controls the operation of the thermosensitive color printer according to the sequence shown in FIG. 3. When the power is supplied, the respective elements are initialized, and the system controller 40 is set in a stand-by state, waiting for an operation on the console 44, or the insertion of a print sheet into the paper I/O port 27, or the insertion of a memory card into the memory card reader/writer 55. When a memory location is designated by keying on the console 44, and if the designated memory location is inside the image memory 49, the system controller 40 checks whether there is a corresponding image data file in the designated location. If the corresponding image data file is not stored in the designated location, an alarming isplay "no file" is given with an alarming sound, and the system controller 40 returns to the stand-by state. If the corresponding image data file exits in the designated location of the image memory 49, the image data is read out from the image memory 49 and is written temporarily in the memory 42 of the system controller 40.

If the designated memory location is inside a memory card, an ID number of the memory card included in the memory location is displayed on the display 43. When the operator inserts a memory card into the memory card reader/writer 55 with reference to the displayed ID number, the system controller 40 compares the ID number of the inserted memory card with the displayed ID number. If these ID numbers are identical, image data is read out from the inserted memory card.

On the other hand, if the designated memory location is outside the printer, the data communication section 50 is activated to connect the printer to the external image data recourse 58 having the designated memory location. Then, the system controller 40 checks whether there is the corresponding image data file in that location. If there is not any corresponding image data file there, alarming sound and display are given to the operator.

If the corresponding image data file exits in the designated location, and there is no need for entering an ID code or a password, the image data is downloaded from the external image data resource 58, and is written temporarily in the memory 42 of the system controller 42 or the image memory 49. If it is necessary to enter an ID code or a password, a corresponding instruction appears on the display 43, so the operator enters the ID code and the password through the console 44. If the entered ID code or the password is not identical to a registered one, or the operator does not enter any ID code or password in a time, an alarming display "no account" is given with an alarming sound. Then, the system controller 40 returns to the stand-by state. In this way, requirement for entering the ID code and password prevents anyone from making a hard copy from the image data without permission. Only when the entered ID code and password are correct, image data is downloaded from the designated memory location of the external image data resource 58, and is written temporarily in the memory 42 of the system controller 42 or the image memory 49.

Thereafter, if it is needed to print the bar code 33 indicating the memory location of the image data, the operator 33 enters a command not to print the bar code 33. Since the thermosensitive color printer is defaulted to print the bar code 33 in the way as shown in FIG. 2, if no command is entered, the bar code data producer 45 produces bar code data, and the image processor 46 synthesizes the bar code image data with the image data. Then, the thermal head driver 52 drives the thermal head 13 in accordance with the synthesized image data. As a result, the bar code 33 is concurrently printed along the margin 35a of the image frame 35. The image frame 35 printed on the recording paper 10 is cut into the print sheet 29, and is ejected through the paper I/O port 27.

When a memory card is inserted in the reader/writer 55 instead of designating the memory location through the console 44, stored image list and thumbnail images from the memory card, wherein the thumbnail images are a kind of abridgements of those image frames stored in the memory card. Then, the thumbnail images are displayed on the display 43. The operator designates an image frame to print with reference to the thumbnail images. Image data of the designated image frame is read out from the memory card. Thereafter, the system controller 40 executes the same printing process as for the case where the memory location is designated by keying. If required, the bar code data producer 45 produces bar code data representative of the memory location of the designated image frame in the memory card as well as the ID number of the memory card, so the bar code 33 is printed besides the image frame.

If the print sheet 29 having the bar code 33 printed on one side of the image frame 35 is inserted into the paper I/O port 27, the feed roller pair 15 is rotated to draw the print sheet 27 into the printer till the bar code 33 is placed under the bar code sensor 31. Then, the bar code reader 32 decodes signals from the bar code sensor 31 into data of the memory location. Thereafter, the same printing process as described above is executed.

In this way, the printer of the present invention may print the bar code 33 indicating the memory location storing the image data of the image frame 35 on one side 35a of the image frame 35. Because the printer of the present invention is able to read the bar code 33 when the print sheet 29 is inserted into the paper I/O port 27, the operator has only to insert the print sheet 29 into the paper I/O port 27 if it is needed to reprint the same image frame 35. Because the same image data as used for printing the original image frame 35 is used for reprinting, the same hard copy as the original is produced without the need for picking up image data from the original. Because the bar code 33 makes it unnecessary to enter the memory location through the console 44, the probability of designating a wrong memory location is reduced to zero.

Accordingly, the thermosensitive color printer of the present invention facilitates reprinting digital print images, especially for those users who are not good at handling digital printing equipments. So it would be convenient for such users if the thermosensitive color printer of the present invention is installed in a camera shop or a photo-lab agency.

Although image data is read out from a memory location directly after the memory location is determined by the bar code in the above embodiment, it is possible to display the memory location represented by the bar code on the display 43, for the operator to confirm it. Moreover, if image data is to be downloaded from the Net, it is possible to estimate and display the cost of data communication and download fee. In case the printer is installed for business in a camera shop or the like, the price of printing may be displayed along with the data communication cost and other costs or fees.

Figure 4:
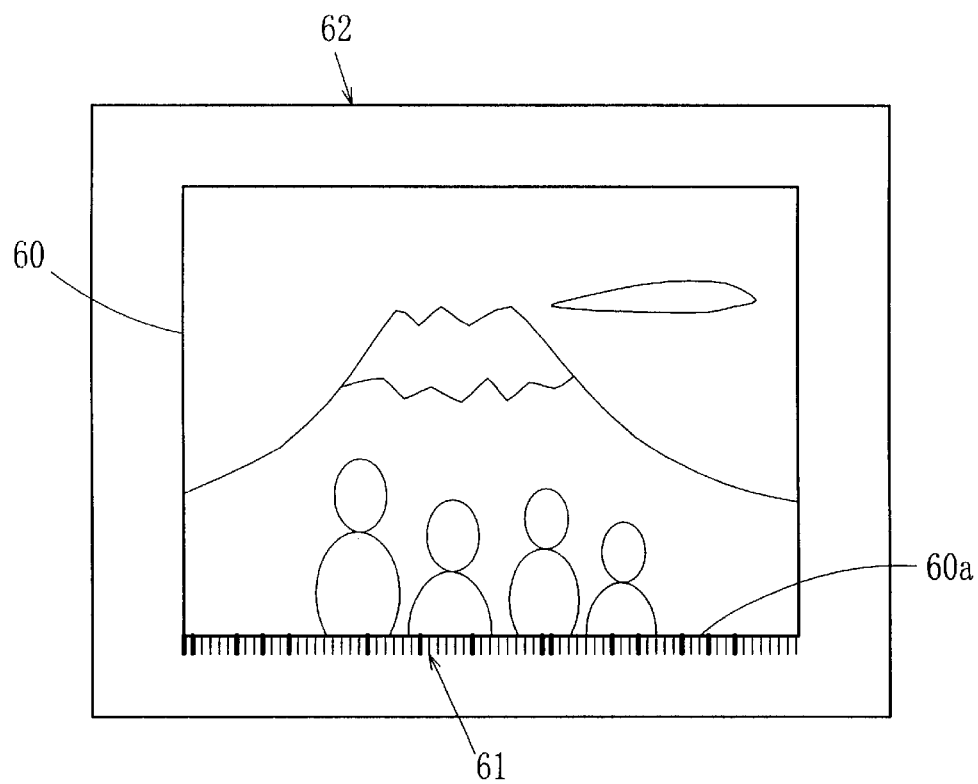
FIG. 4 is a schematic diagram illustrating another example of print sheet made by the thermosensitive color printer.

Although the bar code 33 is printed along the right margin 35a of the horizontally long image frame 35, that is, along a crosswise direction of the long web of recording paper 10, it is possible to print a bar code 61 along a bottom margin 60a of a horizontally long image frame 60 of a print sheet 62, that is, along a lengthwise direction of the recording paper 10, as is shown in FIG. 4. The bar code 61 may be printed along any one or more of the four margins of the image frame 60. It is possible to print the bar code apart from the image frame or inside the image frame, e.g. in a corner of the image frame.

Figure 5:
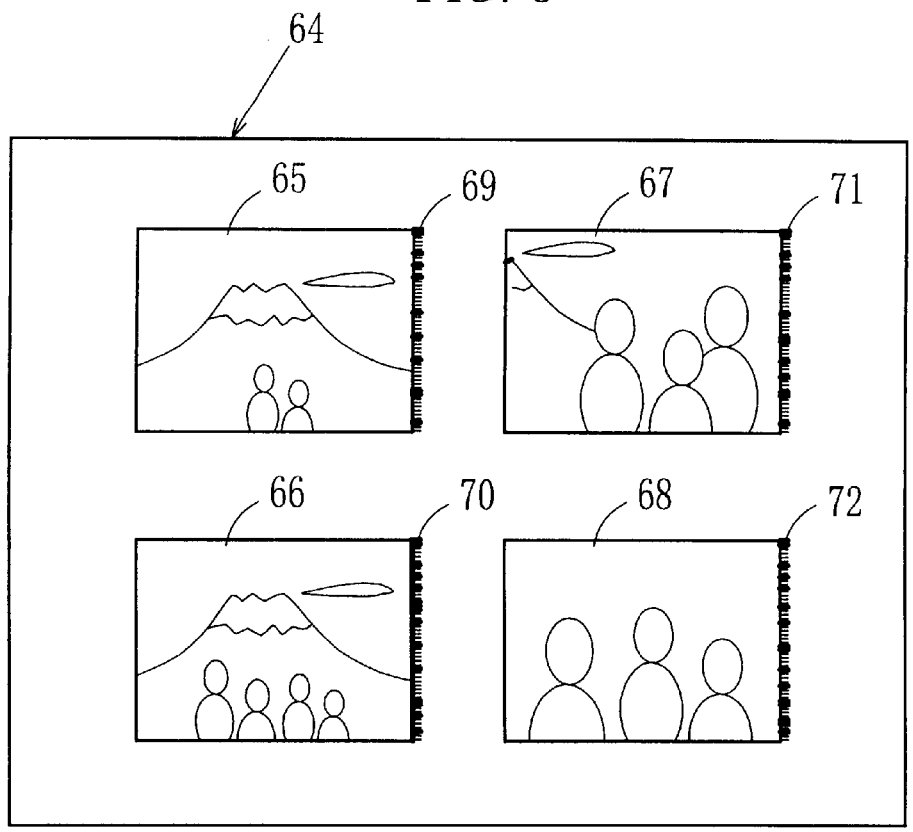
FIG. 5 is a schematic diagram illustrating an example of index print having bar codes printed on one side of individual image frames.

As shown in FIG. 5, it is preferable to print bar codes 69, 70, 71 and 72 along respective image frames 65, 66, 67 and 68 of an index print 64, to indicate memory locations of corresponding image data.

Figure 6:
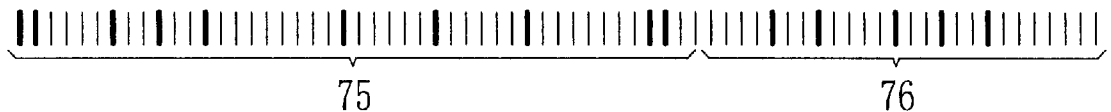
FIG. 6 is a schematic diagram illustrating two kinds of bar codes to be printed with an image frame.

As shown in FIG. 6, it is possible to print a bar code 76 representative of a printing history of each image frame, e.g. the total number of prints made of that image frame, in addition to a bar code 75 representative of a memory location storing image data. It is alternatively possible to produce and print a new bar code representative of the memory location and the printing history in combination.

Figure 7:
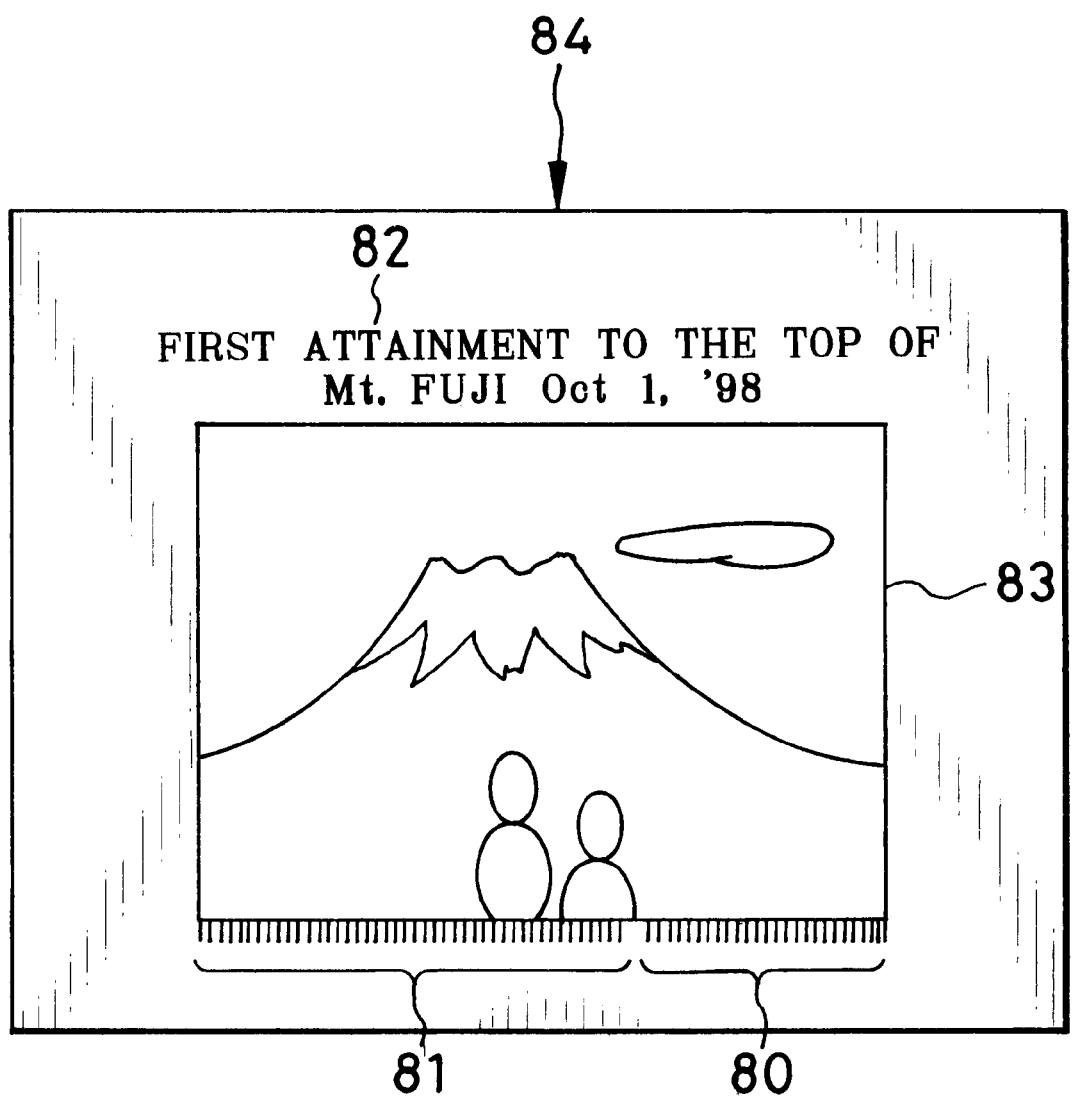
FIG. 7 is a schematic diagram illustrating an example of print sheet having two kinds of bar codes and a caption besides an image frame.

Furthermore, as shown for example in FIG. 7, it is possible to print a bar code 80 representative of information on an image frame 83, e.g. a title, the date of photography or image forming, the name of photographer or producer, and the content of image, in combination with a bar code 81 representative of a memory location having image data of that image frame 83. Thereby, the information on the image frame 83 may be printed automatically in letters 82 on the basis of the bar code 80 when making a print 84.

It is also possible to print the bar code on the back side of the print sheet by use of a specific bar code printer. In that case, it is unnecessary to synthesize the bar code data with the image data of the image frame.

Instead of the bar codes 33, 61, 69 to 72, it is possible to use another code style or another type of data reading device. For example, it is possible to use an OCR (optical character reader) device for reading the memory location data.

Although the bar code 33 is read out through the bar code sensor 31 mounted inside the thermosensitive color printer in the embodiment shown in the drawings, it is possible to provide a thermosensitive color printer with an external bar code reader for reading the bar code from the print sheet. It is also possible to use a handy bar code reader for reading the bar code from the print sheet.

The present invention is applicable to a thermosensitive color printer using a cut sheet type recording material, and also to any other kinds of printers, such as thermal transfer type printers, ink-jet printers, scanning-exposure type silver salt photographic printer.

Thus, the present invention is not to be limited to the above embodiments but, on the contrary, various modifications will be possible to those skilled in the art without departing from the scope of the present invention as specified in appended claims.

What is claimed is:

1. A printer comprising:
   a data entering device for entering data specifying a memory location;
   a data taking device for taking image data from said memory location in accordance with said memory location data; and
   a printing device for printing an image frame on the basis of said image data.

2. A printer as claimed in claim 1, further comprising a second printing device for printing said memory location data along with said image frame.

3. A printer as claimed in claim 2, wherein said data entering device comprises a device for reading said printed memory location data.

4. A printer as claimed in claim 3, wherein said second printing device prints said memory location data as a bar code.

5. A printer as claimed in claim 4, wherein data for printing said bar code is synthesized with said image data so said bar code is printed with said image frame by a printing head.

6. A printer as claimed in claim 2, wherein said device for reading said printed memory location data is placed behind a paper I/O port, to read said printed memory location data when a print sheet containing said memory location data and said image frame thereon is inserted into said paper I/O port, and wherein said printer ejects print sheets made in said printer through said paper I/O port.

7. A printer as claimed in claim 2, wherein the second printing device prints data relating to said image frame together with said memory location data.

8. A printer as claimed in claim 1, further comprising a data communication device for taking said image data from an external image data resource.

9. A printer as claimed in claim 1 or 8, wherein said data taking device reads out image data from said memory location when a correct password or a correct ID data is entered.

10. A printing method for printing an image frame on the basis of digital image data, comprising the steps of:
    printing data specifying a memory location, said memory location data storing said image data along with said image data;
    reading said printed memory location data when to reprint said image frame;
    reading said image data from said memory location in accordance with said memory location data; and
    reprinting said image frame on the basis of said image data.

11. A printing method as claimed in claim 10, wherein said memory location data is printed as a bar code along with said image frame.

12. A printing method as claimed in claim 11, wherein said bar code is printed in yellow.

13. A printing method as claimed in claim 11, further comprising the steps of synthesizing data of said bar code with said image data, and printing said bar code and said image frame on the basis of said synthesized data.

14. A printing method as claimed in claim 10, further comprising the steps of:
    checking if said image data exists in said memory location designated by said memory location data; and
    giving an alarm if said image data does not exit in said memory location.

15. A print containing an image frame and memory location data thereon, said image frame being printed on the basis of digital image data, and said memory location data representative of a memory location that stores said image data.

16. A print as claimed in claim 15, wherein said memory location data is printed as a bar code.

17. The printer of claim 1, wherein said data entering device enters data specifying a memory location from a print sheet, said print sheet having an image frame printed thereon based on the image data specified by said memory location.

\* \* \* \* \*